United States Patent [19]

Hattori et al.

[11] Patent Number: 5,020,565
[45] Date of Patent: Jun. 4, 1991

[54] WATER HAMMER ABSORBER

[75] Inventors: Mitsutaka Hattori; Toshiaki Yoshimi; Toshio Fukushima, all of Aichi, Japan

[73] Assignee: Inax Corporation, Japan

[21] Appl. No.: 483,316

[22] Filed: Feb. 21, 1990

Related U.S. Application Data

[63] Continuation of Ser. No. 218,201, Jul. 13, 1988, abandoned.

[30] Foreign Application Priority Data

Jul. 24, 1987 [JP] Japan .............................. 62-113618
Nov. 18, 1987 [JP] Japan .............................. 62-175919
Nov. 18, 1987 [JP] Japan .............................. 62-175920

[51] Int. Cl.$^5$ .............................................. F15B 1/02
[52] U.S. Cl. .................................... 137/207; 137/192
[58] Field of Search ....................... 137/207, 888, 192

[56] References Cited

U.S. PATENT DOCUMENTS

| | | |
|---|---|---|
| 3,018,799 | 2/1958 | Volkmann et al. |
| 3,137,316 | 6/1964 | Everett .............................. 137/207 X |
| 3,146,796 | 9/1964 | Everett .............................. 137/207 X |
| 3,444,883 | 5/1969 | Slaughter ............................. 137/207 |
| 3,672,398 | 6/1972 | Ichiryu et al. |
| 3,942,549 | 3/1976 | Tobin . |
| 4,344,752 | 8/1982 | Gallagher .......................... 137/888 X |
| 4,518,005 | 5/1985 | Allewitz ................................ 137/207 |

FOREIGN PATENT DOCUMENTS

| | | |
|---|---|---|
| 36455 | 9/1900 | Fed. Rep. of Germany . |
| 1253973 | 11/1967 | Fed. Rep. of Germany . |
| 1296904 | 6/1969 | Fed. Rep. of Germany . |
| 1924047 | 11/1970 | Fed. Rep. of Germany . |
| 1775217 | 7/1971 | Fed. Rep. of Germany . |
| 2635360 | 6/1982 | Fed. Rep. of Germany . |

OTHER PUBLICATIONS

*Soviet Inventions Illustrated*, Section P,Q, Week E17, Jun. 9, 1982, Q67, p. 14.

Primary Examiner—Alan Cohan
Attorney, Agent, or Firm—Parkhurst, Wendel & Rossi

[57] ABSTRACT

A water hammer absorber provided in a cold or hot water supply passage including: a tubular portion whose cross section gradually decreases toward a flow direction of cold or hot water until the inner diameter of the portion becomes minimum and then gradually increases toward that direction so that a negative pressure generates therein; and a pressure absorbing chamber which is formed at the minimum inner diametered section of the tubular portion or therearound at the downstream side so as to communicate with the water supply passage and which is provided with a passage-way leading to the atmosphere and a check valve disposed in the passage-way and capable of admitting the entry of air only into the pressure absorbing chamber. The absorber according to the invention is suitably used in the joint of a delivery faucet or a mixing faucet.

6 Claims, 10 Drawing Sheets

PRIOR ART

WATER HAMMER ABSORBER

This application is a Rule 62 Continuation Application of Ser. No. 07/218,201, filed July 13, 1988, now abandoned.

FIELD OF THE INVENTION AND RELATED ART STATEMENT

The present invention relates to a novel water hammer absorber that absorbs water hammer produced in a cold or hot water supply pipe or the like to protect the supply pipe itself and a faucet appliance connected to the pipe for delivering water or stopping water flow.

Figure 3:
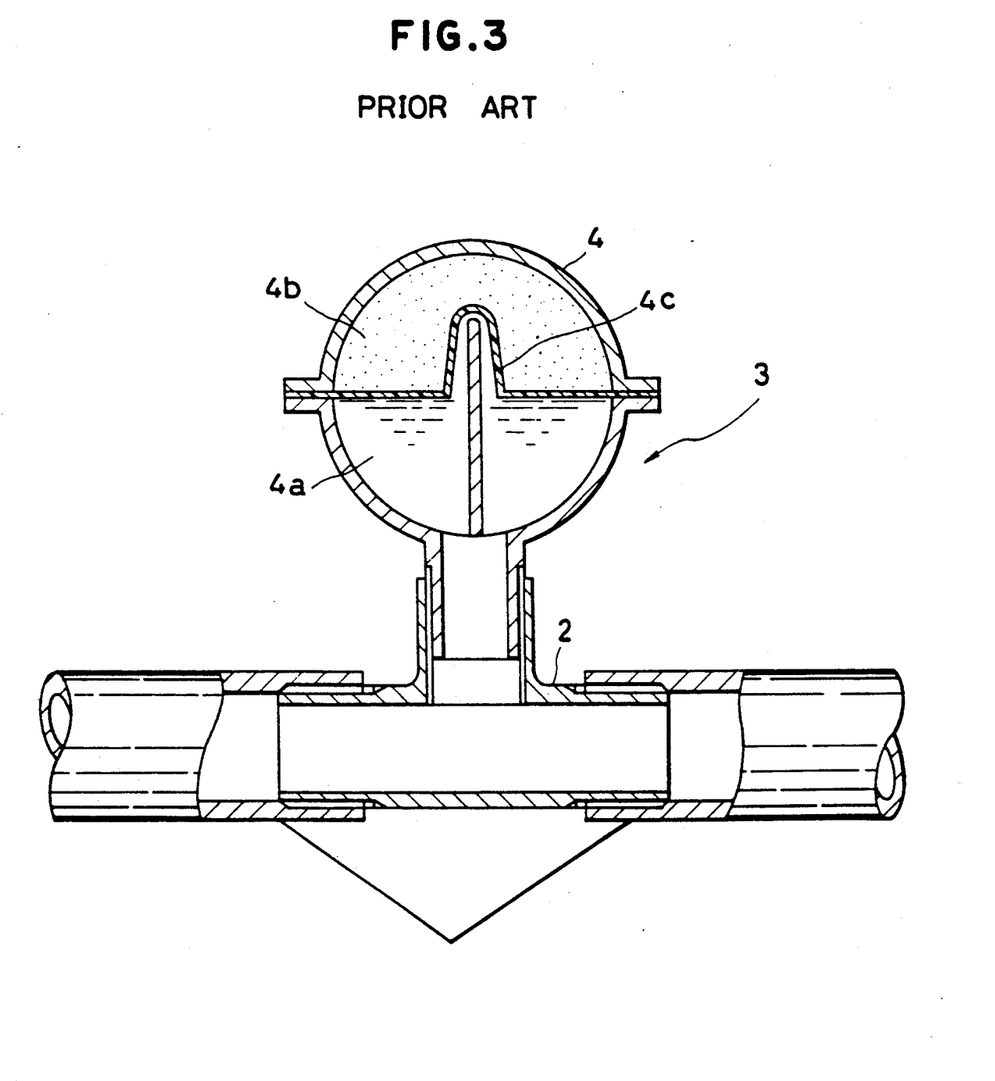
FIG. 3 is a cross-sectional view of a conventional water hammer absorber.

FIG. 3 is a side elevation in cross section of a conventional water hammer absorber. The absorber, generally indicated by numeral 3, is mounted in a pipe 1 that supplies cold or hot water to a delivery faucet mounted above a washstand or sink (not shown). The absorber 3 consists of a spherical casing 4 and a joint pipe 2. The inside of the casing 4 is partitioned into a pressurization chamber 4a and a compression chamber 4b by a diaphragm 4c. Generally, the compression chamber 4b is sealed with nitrogen gas. The pressure inside the chamber 4b is kept at about 4 Kg/cm² If nitrogen gas should leak, it would not be dangerous to the human body. For these reasons, nitrogen gas is used. The pressurization chamber 4a is in communication with the supply pipe 1 through the joint pipe 2. When a faucet appliance (not shown) connected to the supply pipe 1 is quickly operated to stop water flow, the pressure inside the pipe 1 rises excessively, thus producing a shock wave. Then, the wave is transmitted through the pipe 1. The water inside the pressurization chamber 4a of the absorber 3 curves the diaphragm 4c toward the compression chamber 4b. Therefore, no reflecting wave is produced in response to the shock wave. Consequently, the water hammering disappears.

The volume of the conventional water hammer absorber 3 is large, because it has the pressurization chamber 4a filled with water and the compression chamber 4b having a content volume large enough to permit deformation of the diaphragm 4c. Therefore, it is impossible to later attach the absorber 3 to the water supply pipe 1 which is mounted in the rear of a wall or the like. The possibility was contemplated that the water hammer absorber 3 was mounted to the joint with a delivery faucet or mixing faucet (not shown) at which the supply pipe 1 protruded from a building wall. However, this was hardly realized, because it was quite inferior from an aesthetical point of view. Further, the conventional water hammer absorber 3 has the following disadvantages. The diaphragm 4c is made from nitrile rubber or the like, and also acts as packing for preventing leakage of gas from the compression chamber 4b. However, it is unable to provide perfect seal. Further, the nitrile rubber itself transmits a trace of nitrogen gas. Therefore, the water hammer absorber ceases to function satisfactorily in a relatively short term of about six months to one year. Whenever the performance drops, the absorber is recharged with gas, or the absorber 3 itself is replaced with a new one. Hence, the running cost is high. Furthermore, the recharging operation and the replacing operation are quite cumbersome to perform, because the absorber 3 is usually mounted in the depths of a building, in a pipe extending through a wall, or in a pipe mounted in a compartment formed below a sink or washstand.

OBJECTS AND SUMMARY OF THE INVENTION

In view of the foregoing circumstances, the present invention has been made. It is an object of the invention to provide a water hammer absorber which makes it unnecessary to recharge the absorber with nitrogen gas or to replace the absorber itself and which can save the running cost.

It is another object of the invention to provide a novel water hammer absorber which is adapted for use with a mixing faucet and can be mounted to the joint between a cold or hot water supply pipe protruding from a building wall and a mixing faucet or the like.

It is a further object of the invention to provide a water hammer absorber which is adapted for use with a washstand.

According to the invention there is provided a water hammer absorber comprising a tubular portion and a pressure-absorbing chamber. The tubular portion is provided in a water supply passage and the cross section thereof gradually decreases toward a flow direction of cold or hot water flows until the inner diameter thereof becomes minimum and then gradually increases in the flow direction of the cold or hot water so that a negative pressure generates therein by the passage of the cold or hot water therethrough. Further, the pressure absorbing chamber is formed in the water supply tube and at the minimum inner diametered section of the tubular portion or therearound at the downstream side and provided with a passage communicating the atmosphere and a check valve disposed in the passage and capable of admitting the entry of air only in the pressure-absorbing chamber.

According to the invention there is also provided a water hammer absorber comprising an inner choke tube and a body portion. The choke tube has a narrowed portion which is disposed in a water supply passage for supplying cold or hot water. The body portion is disposed above the choke tube and having a pressure-absorbing chamber that is in communication with the narrowed portion through a water injection passage. A valve seat is formed inside the chamber and around the entrance of the chamber from which the water injection passage extends. A float valve is disposed inside the chamber opposite to the valve seat. A short tapering pipe is mounted in the narrowed portion. All the water flowing into the choke tube passes through the tapering pipe. A negative pressure is produced by the flow of water through the tapering pipe. Preferably, a gap is formed between the inner surface of the narrowed portion and the tapering pipe to transmit the negative pressure to the water injection passage through the narrowed portion.

It is now assumed that a shock wave is produced by a violent rise in the pressure inside the water supply pipe. When water flows through the inner choke tube mounted in the water supply pipe, the inside of the pressure-absorbing chamber in the body portion is filled with air. The shock wave reaching the choke tube flows into the chamber through the water injection passage as flow of cold or hot water. Therefore, the shock wave is absorbed, and no reflecting wave is generated. The water hammer disappears.

When water flows through the inner choke tube, the inside of the pressure-absorbing chamber is filled with air, because the chamber is in communication with the narrowed portion of the choke tube. In particular, when cold or hot water flows through the water supply pipe, a differential pressure is created between the supply pipe and the narrowed portion of the choke tube. Of course, the pressure inside the narrowed portion becomes lower than the pressure inside the supply pipe, thus producing a negative pressure This negative pressure prevents hot or cold water from flowing into the chamber. Therefore, the chamber is always ready to absorb a shock wave caused by a violent rise in the pressure. The float valve disposed in the chamber acts to prevent an excessive amount of air from being drawn from the chamber when the pressure inside the narrowed portion of the choke tube is negative. When a shock wave forces cold or hot water into the chamber, the valve floats so as not to impede the inflow of the water.

According to the invention there is further provided a water hammer absorber mounted in a pipe connected with a delivery faucet installed over a washstand, sink, or the like. The absorber includes an intake coupling and a discharge coupling connected with water supply pipes and a water stop cock. The absorber further includes a water channel interconnecting the couplings and having a narrowed portion. A pressure-absorbing chamber is formed around the narrowed portion and in communication with the narrowed portion via one or more water injection holes.

According to the invention there is yet provided a water hammer absorber mounted in a mixing faucet, the absorber comprising an intake coupling connected with a cold or hot water supply pipe mounted in a building wall or the like, a discharge coupling connected with the body of the faucet, a water channel interconnecting the couplings and having a narrowed portion, and a pressure-absorbing chamber formed around the narrowed portion and placed in communication with the narrowed portion via one or more water injection holes.

We now assume that the mixing faucet or the delivery faucet installed over a washstand or the like is quickly operated to stop the flow of water and that a shock wave is produced in the pipe connected with the faucet, such as a water supply pipe, by a violent rise in the pressure. When water flows through the water supply pipe, the inside of the pressure-absorbing chamber is filled with air or contains a mass of air. Thus, the shock wave reaching the narrowed portion flows into the chamber through the water injection passage as flow of water. Since the shock wave compresses the air, it is absorbed, and no reflecting wave is produced. Consequently, the water hammer disappears.

As can be understood from the description made thus far, a special gas such as nitrogen gas is not stored in the novel water hammer absorber and so there is no possibility of leakage of gas. Therefore, neither recharging of the absorber with gas nor replacement of the absorber itself is required. Also, there exist no mechanical moving parts except for attachments for the check valve. For this reason, the possibility of trouble is almost eliminated. In other words, the absorber can be used almost permanently at no running cost.

In the conventional water hammer absorber, the nitrogen gas filling the compression chamber is compressed to secure space allowing inflow of cold or hot water, thus absorbing a shock wave. In this structure, the diaphragm that absorbs a shock wave is required to have a large area. Further, a sufficient volume of nitrogen must be compressed inside the compression chamber. Consequently, the conventional absorber is made considerably large in size. In contrast with this, in the novel absorber, the air inside the pressure-absorbing chamber is mixed with cold or hot water to absorb a shock wave. Therefore, the space inside the chamber which is used to absorb a shock wave can be effectively utilized. Further, larger pressures can be absorbed, since a shock wave is converted into flow of cold or hot water into the chamber. Even with a supply pipe to which plural delivery faucets are connected in such a manner that the pipe branches off, it is not necessary to mount the novel absorber to every delivery faucet; it suffices to mount the single absorber to the main pipe at a location where it does not yet branch off. In other words, the novel absorber mounted to a single delivery faucet can be rendered quite small. In this way, the novel absorber yields various excellent advantages.

The appearance of the novel absorber can be hardly distinguished from a leg normally mounted to a mixing faucet, by connecting the intake coupling with a cold or hot water supply pipe mounted in a building wall or the like and connecting the discharge coupling with the body of the mixing faucet. Accordingly, one who sees this absorber would not feel strange. The absorber can also be mounted to a mixing faucet already installed. If necessary, it can be mounted to only a cold water supply pipe or a hot water supply pipe.

DESCRIPTION OF THE PREFERRED EMBODIMENTS

Figure 9:
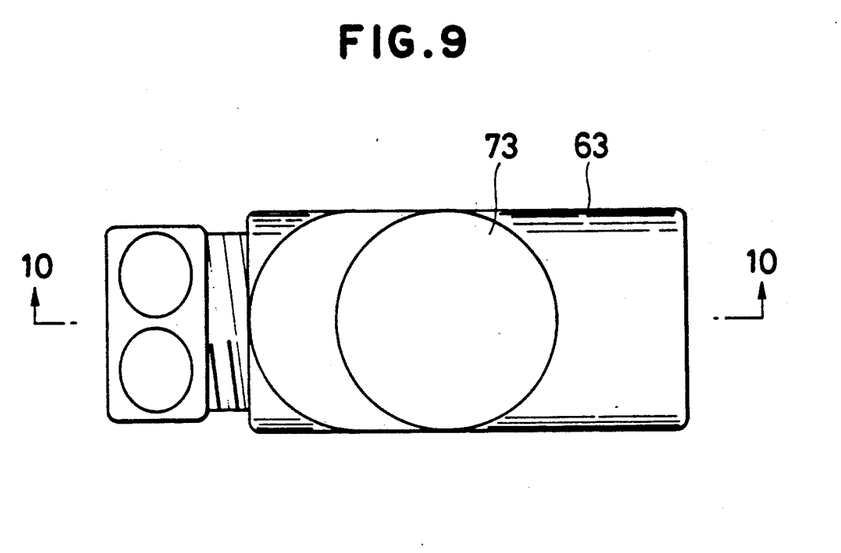
FIG. 9 is a plan view of another embodiment of the water hammer absorber according to the present invention.
Figure 10:
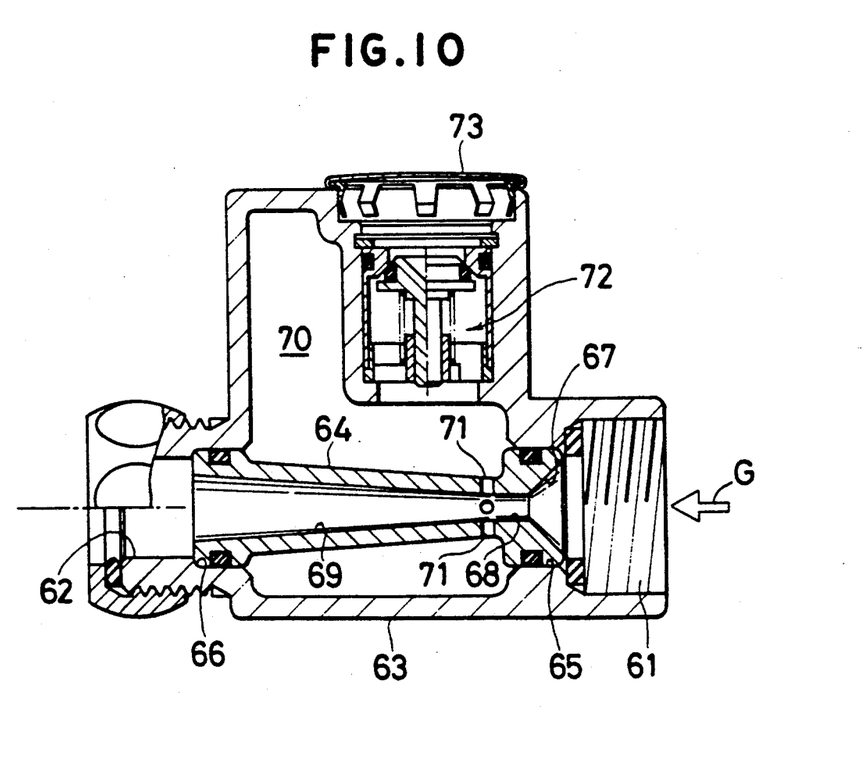
FIG. 10 is a vertical cross-sectional view taken on 10—10 line of FIG. 9.

FIGS. 9 and 10 show preferred embodiments of the present invention wherein there is provided a water tube 64 forming itself a supply passage in a casing 63 provided with a cold or hot water inlet port 61 and an outlet port 62. Both ends of the tube 64 are fitted in portions 65 and 66 having circular inner peripheral surfaces and provided adjacent the ports 61 and 62, respectively. The tube 64 is in the form of a venturi and includes a portion 67 whose inner diameter gradually decreases toward a direction G of the flow of water, a minimum inner diametered section 68 and a portion 69 whose inner diameter gradually increases. The outer periphery of the tube 64 of the casing 63 defines a pressure-absorbing chamber 70 which is in communication with the tube 64 through an opening 71 provided at a portion slightly spaced toward the downstream side from the minimum diametered section 68. In the the casing 63 there is provided is a check valve 72 covered with a ventilating dustproof cap and which operates such that it admits only the entry of the air into the pressure-absorbing chamber 70 and checks the outflow of a fluid from the casing 63.

Next, the operation of the absorber according to the present invention will be described. The absorber is mounted in such a manner that water flows along the direction G designated by the arrow. When no water flows through the tube 64 of the absorber, the pressure-absorbing chamber 70 is almost full of water. Assuming that water be made to flow through the tube 64 by operating a faucet appliance (not shown) on the downstream side of the absorber. Then the inner pressure of the minimum inner diametered section or therearound on the downstream side becomes negative Accordingly, the water filling the pressure absorbing chamber 70 tends to be sucked into the tube 64 through the opening 71 and at the same time, the open air is sucked into the pressure absorbing-chamber 70 through the check valve 72 so that the chamber 70 is filled with the air.

Now, assuming that a shock wave be transmitted to the flow of the water due to an abrupt pressure rise in a direction reverse to the water flow by suddenly operating the faucet appliance to stop the water, the shock wave would enter the pressure-absorbing chamber 70 through the opening 71 as a flow of the water. Accordingly, the energy of the shock wave would be absorbed without the generation of a reflecting wave resulting therefrom so that no water hammer phenomenon takes place. Then, when the faucet appliance is opened, water flows through the tube 64 again so that the pressure absorbing chamber is filled with air so as to become ready for the absorption of a next shock wave.

Figure 11:
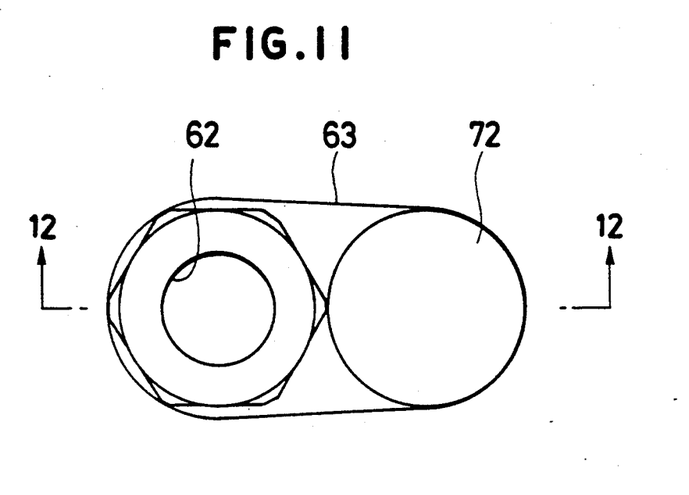
FIG. 11 is a plane view of still another embodiment of the water hammer absorber according to the present invention.
Figure 12:
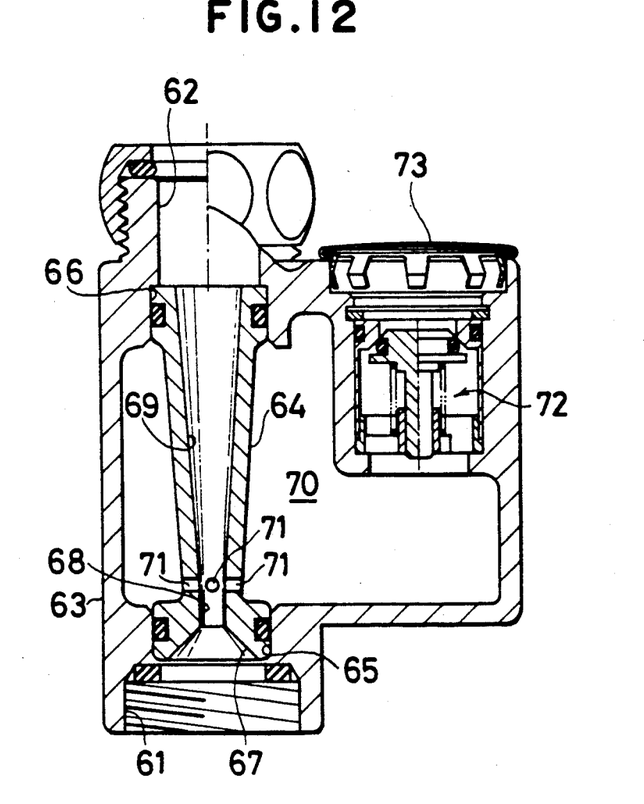
FIG. 12 is a sectional view taken on line 12—12 of FIG. 11.

The absorber shown in FIGS. 11 and 12 is so mounted as cold or hot water flows upward and in this attitude the check valve 72 is arranged at a portion above the pressure-absorbing chamber 70. As the remaining structure is the same as that shown in FIGS. 9 and 10, like portions or members are designated by the same reference numerals Further, in FIGS. 10 and 12, the opening 71 may be provided at the minimum diametered section 68.

Figure 1:
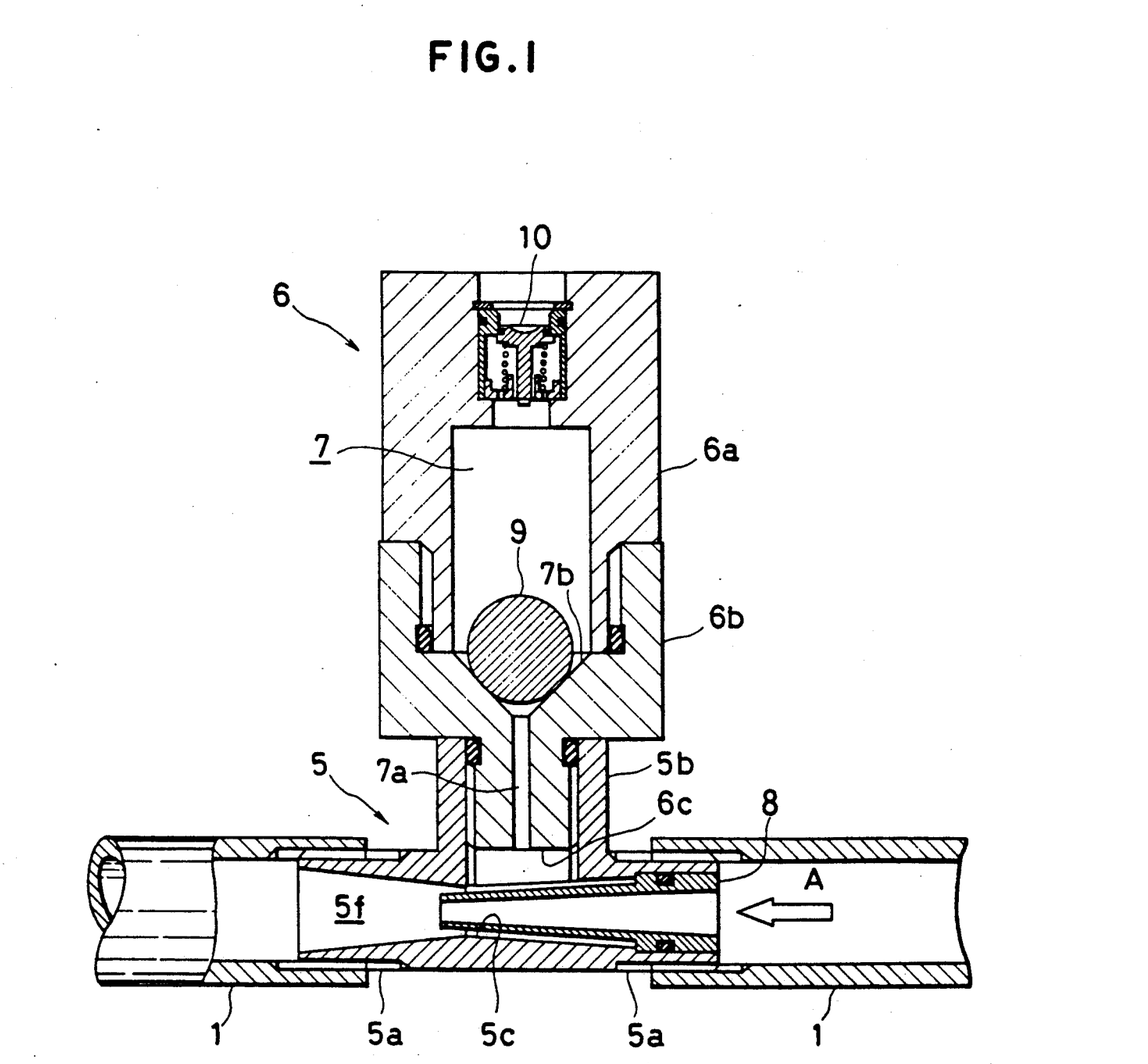
FIG. 1 is a cross-sectional view of a preferred embodiment of hammer absorber according to the invention.
Figure 2:
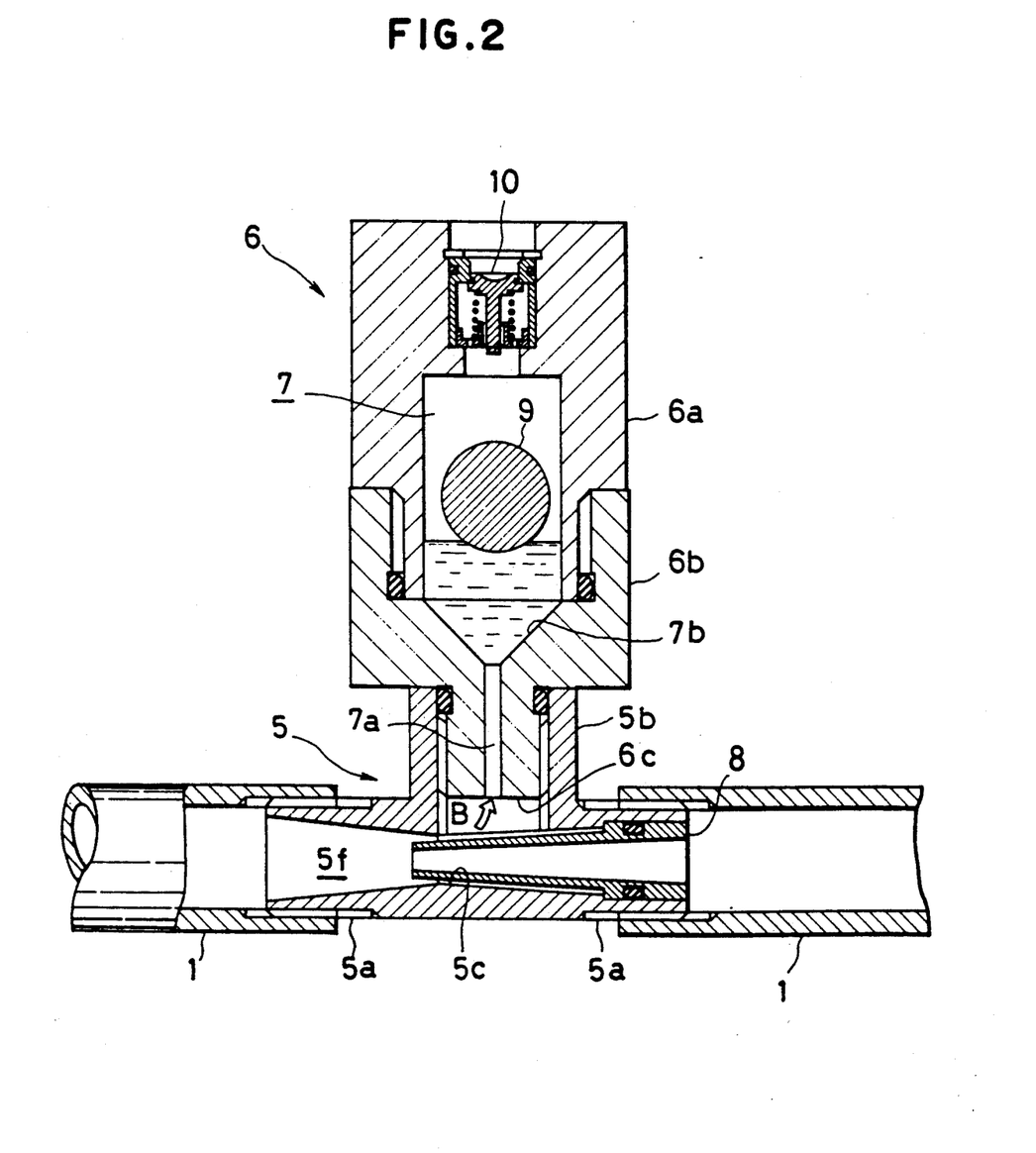
FIG. 2 is a view illustrating an operation of the water hammer absorber shown in FIG. 1.

Referring to FIGS. 1 and 2, there is shown a water hammer absorber embodying the concept of the present invention. The body of the absorber is generally indicated by numeral 6. The absorber includes an inner choke tube 5 that is mounted inside a supply pipe 1 for supplying cold or hot water. The choke tube 5 has couplings 5a at its both ends to permit the tube 5 to be connected to the supply pipe 1. The tube 5 has a narrow portion 5c in its center. The inside diameter of the tube decreases gradually from the couplings 5a at both ends of the tube 5 to the narrow portion 5c. The inside diameter of the narrow portion 5c is about half of the inside diameter of the supply pipe 1. A branch tube 5b extends upwardly from the narrow portion 5c, and is internally threaded to form a coupling for connection with the body 6.

The body 6 takes the form of a long cylinder, and can be divided into an upper cylindrical portion 6a and a lower cylindrical portion 6b. The inside of the upper portion 6a is hollow. When the upper portion 6a is coupled to the lower portion 6b, a pressure-absorbing chamber 7 is formed. The lower portion 6b has an externally threaded end portion 6c, which extends downward and is screwed into the branch tube 5b of the inner choke tube 5. The end portion 6c is provided with a water supply passage 7a. A conic valve seat 7b is formed around the opening in the passage 7a which is located on the side of the pressure-absorbing chamber 7.

A spherical float valve 9 is mounted in the pressure-absorbing chamber 7 that is formed when the upper tubular portion 6a and the lower tubular portion 6b are coupled together. The valve 9 is made of a synthetic resin or other similar material and floats on water. When the externally threaded end portion 6c of the body 6 is engaged in the branch tube 5b of the inner choke tube 5, a space is left below the end portion 6c inside the body 6. The diameter of this space is considerably larger than the inside diameter of the narrow portion 5c of the choke tube 5 and so the space substantially increases the inside diameter of the narrow portion 5c. If this space was left as it was, then negative pressure would be reduced by this space. In this example, therefore, a tapering i short pipe 8 is inserted in the coupling 5a at one end of the choke tube 5. The thick of the short pipe 8 is fitted in the end of the choke tube 5 at which water enters. All the water flowing into the choke tube 5 passes through the pipe 8, which is long enough to extend across the narrowest section of the narrow portion 5c. The choke tube 5 has a drain portion 5f into which water flows through the narrowest end of the short pipe 8. When water enters the drain portion 5f from the short pipe 8, a negative pressure is produced in the drain portion 5f. The negative pressure is transmitted to the water supply passage 7a through a clearance formed between the outer surface of the pipe 8 and the inner surface of the narrow portion 5c.

The absorber is so mounted that cold or hot water flows in the direction indicated by the arrow A. When no water flows through the supply pipe 1 as shown in FIG. 2, cold or hot water which flowed into the pressure-absorbing chamber 7 in the body 6 from the drain portion 5f in the supply pipe 1 as indicated by the arrow B stays in the chamber 7. When cold or hot water is forced through the supply pipe 1 using a faucet appliance (not shown) connected with the pipe 1, a pressure difference is created between the coupling 5a on the exit side and the narrow portion 5c, thus producing a negative pressure inside the narrow portion 5c. Then, the cold or hot water which first flowed into the pressure-absorbing chamber 7 in the body 6 is drawn and expelled. As a result, the float valve 9 closes off the water supply passage 7a as shown in FIG. 1.

Under this condition, if the faucet appliance (not shown) is quickly operated to stop the flow of water, then the pressure inside the supply pipe 1 rises violently, producing a shock wave. The shock wave raises the float valve 9 that closes off the passage 7a, and enters the pressure-absorbing chamber 7 as flow of hot or cold water. Therefore, the energy of the shock wave is absorbed. No reflecting wave is produced in response to the shock wave. Consequently, the water hammering disappears. If the faucet appliance (not shown) is subsequently used, then hot or cold water flows through the supply pipe 1, and cold or hot water is drawn out of the pressure-absorbing chamber 7 in the body 6. Hence, the absorber is momentarily reset.

When water is drawn from the chamber 7 and expelled, there arises the possibility that even air needed for the chamber 7 is drawn into the supply pipe 1. In the present example, therefore, a check valve 10 is mounted in the upper cylindrical portion 6a in the body 6 to inhale air. As soon as water is drawn out of the chamber 7, the check valve 10 takes in substantially the same amount of outside air to promote discharge of the water.

It is to be noted that neither the aforementioned tapering short pipe 8 nor the check valve 10 is essential to the invention. The body 6 can also be shaped in the form of a square pole or disk. The absorber can be mounted anywhere in the connected pipe, including a position located immediately before the faucet appliance. Further, it may be incorporated in a faucet appliance, such as a delivery pipe, instantaneous water heater, or water-heating appliance. In this way, the structure and the shape of the novel absorber may be varied according to practical situations.

Figure 4:
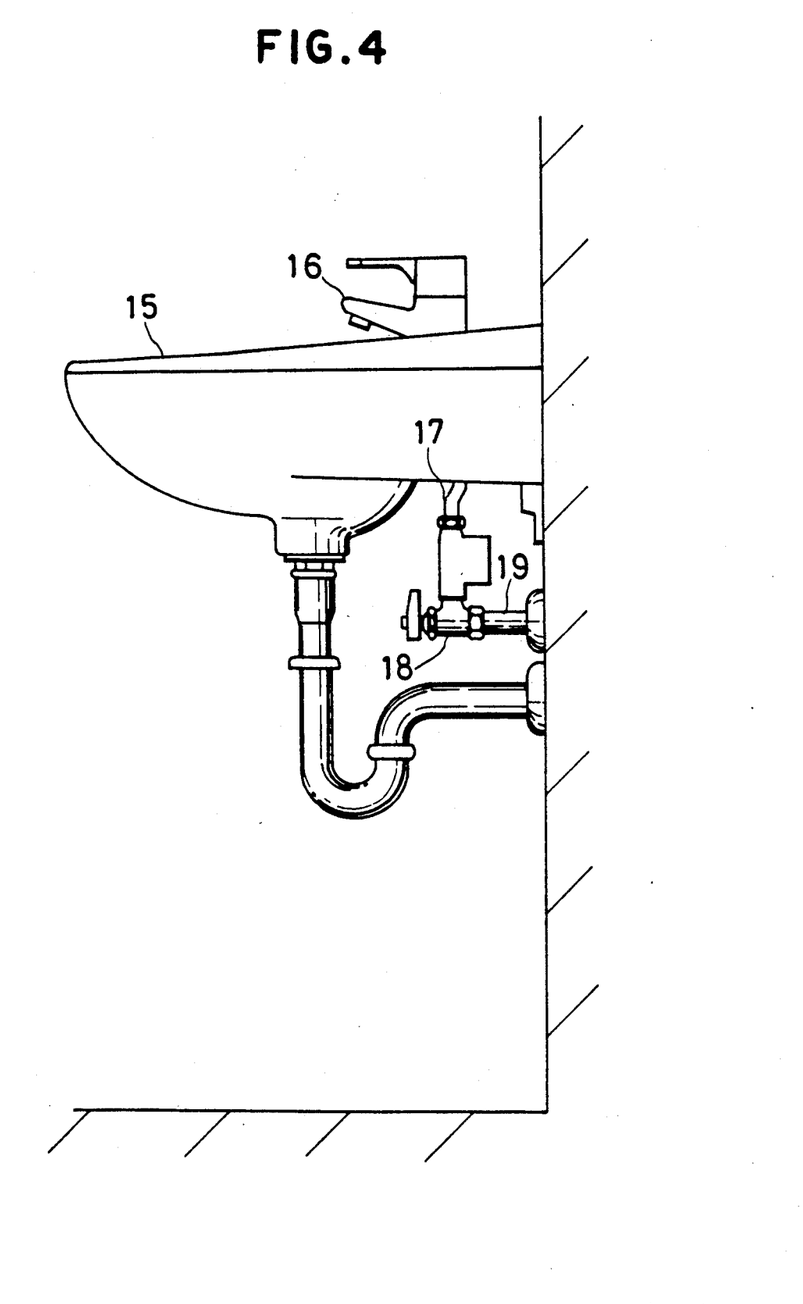
FIG. 4 is a side elevation of a washbowl equipped with a water hammer absorber according to the invention.

Referring next to FIG. 4, there is shown a washbowl 15 equipped with another water hammer absorber according to the invention. A delivery faucet 16 is mounted above the washbowl 15 and receives hot or cold water from piping that includes a supply pipe 17 and a water stop cock 18. The absorber is mounted in a pipe that connects the pipe 17 with the cock 18.

Figure 5:
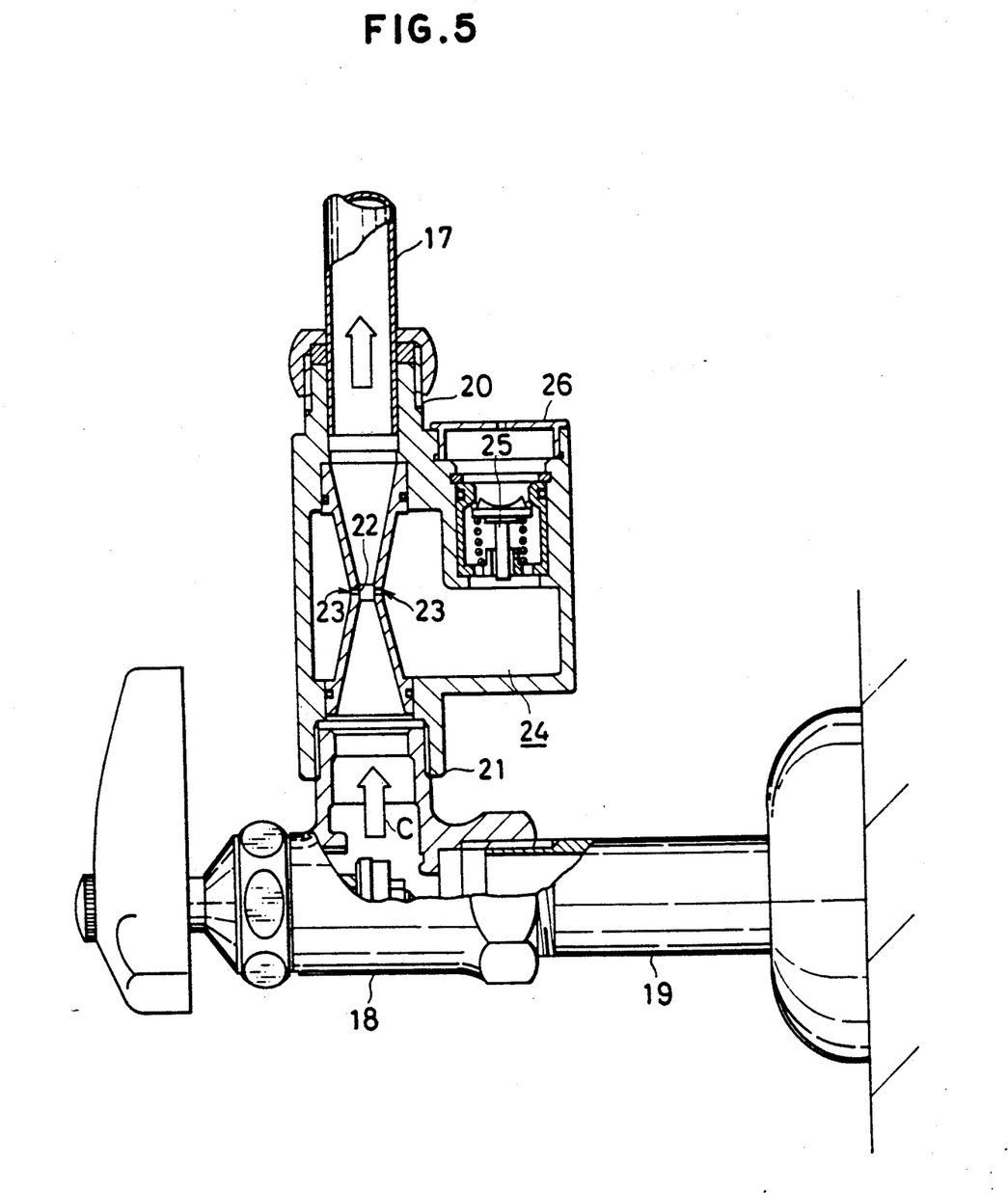
FIG. 5 is an enlarged cross-sectional view of the absorber installed in the washbowl shown in FIG. 4.

The absorber is particularly shown in FIG. 5, and has an intake coupling 21 at its lower end for connection with the water stop cock 18. The absorber includes a discharge coupling 20 at its upper end for connection with the supply pipe 17. The inside diameter of the passage formed between the couplings 20 and 21 is gradually changed such that it is narrowest about its center. The narrowest portion, indicated by numeral 22, is provided with one or more water injection holes 23 extending laterally through it. In this specific example, the tapering portions located on opposite sides of the narrowest portion 22 are formed integrally out of an anticorrosion metal, such as stainless steel, brass, or bronze, or other material, such as rubber or synthetic.

Figure 6:
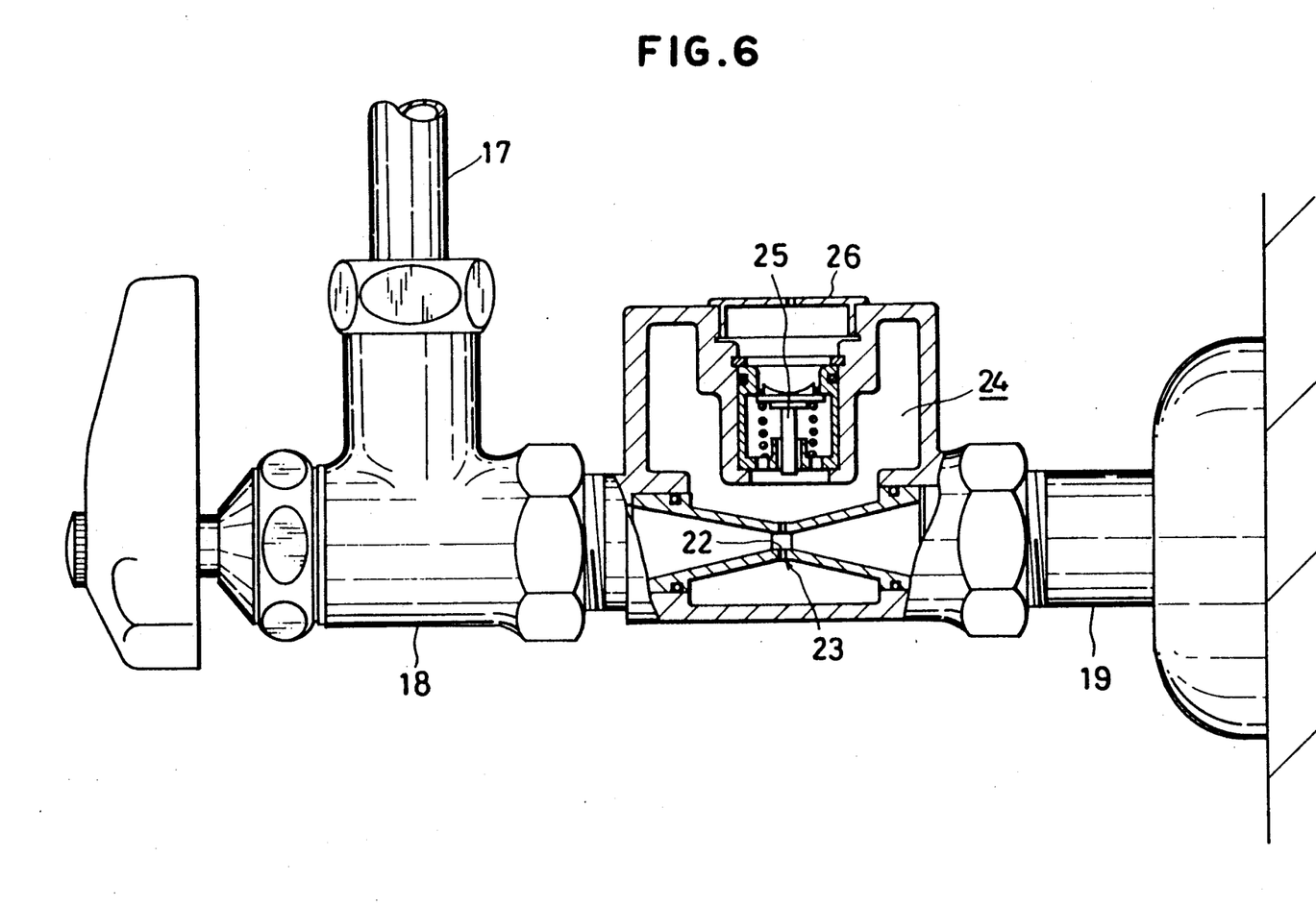
FIG. 6 is a view similar to FIG. 5, but showing a different manner in which a check valve is mounted.

A pressure-absorbing chamber 24 is formed around the narrowest portion 22 and extends laterally to form a boxlike portion. A check valve 25 used for air suction alone is mounted on the boxlike portion. A dustproof cap 26 is mounted over the check valve 25. Preferably, the valve 25 is so mounted that it moves vertically. Where the absorber is mounted in a horizontal pipe such as the joint between the water stop cock 18 and the water supply pipe 19, the check valve 25 may be mounted as shown in FIG. 6.

The operation of the absorber is now described by referring to FIG. 5. The absorber is so mounted that water flows in the direction indicated by the arrow C. When no water flows through the narrowest portion 22, the pressure-absorbing chamber 24 is substantially filled with water. It is now assumed that the delivery faucet 16 (see FIG. 4) located above the washbowl 15 is opened to permit water to flow through the narrowest portion 22. At this time, the pressure inside the narrowest portion 22 becomes lower than the pressure inside the supply pipe 19, creating a negative pressure. Then, the water contained in the pressure-absorbing chamber 24 is drawn into the supply pipe 19 through the water injection holes 23 in the narrowest portion 22. Simultaneously, outside air is drawn into the chamber 24 via the check valve 25. Thus, the chamber 24 is filled with air.

We now assume that the delivery faucet 16 is quickly closed and that a shock wave due to a violent rise in the pressure is transmitted through the supply pipe 17 in a reverse direction. The shock wave enters the pressure-absorbing chamber 24 from the water injection holes 23 as flow of water. The energy of the shock wave is absorbed and so no reflecting wave is produced in response to the shock wave. In this manner, the water hammering disappears. If the delivery faucet 16 is subsequently opened, water again flows through the narrowest portion 22. Then, the pressure-absorbing chamber 24 is again filled with air. Thus, preparations are made for absorption of the next shock wave.

The position at which the absorber is mounted is not limited to a location (FIG. 5) lying between the supply pipe 17 and the water stop cock 18 or to a location (FIG. 6) situated between the water stop cock 18 and the water supply pipe 19. The absorber may be installed between the supply pipe 17 and the delivery faucet 16 in a manner not illustrated. Sometimes, the water supply pipe 19 extending upright from a floor is directly connected to the delivery faucet 16 disposed above the washbowl 15. In this case, the absorber may be mounted in the supply pipe 19 or between the pipe 19 and the delivery faucet 16. The pressure-absorbing chamber 24 may be shaped like an independent can and connected from outside of the narrowest portion 22. Of course, the location of the narrowest portion 22 formed in the passage in the absorber, the number of the water injection holes 23 formed in the narrowest portion 22, the diameter of the holes, the positions of the holes, and other factors may be modified according to the pressure of the supplied water and other considerations.

Figure 7:
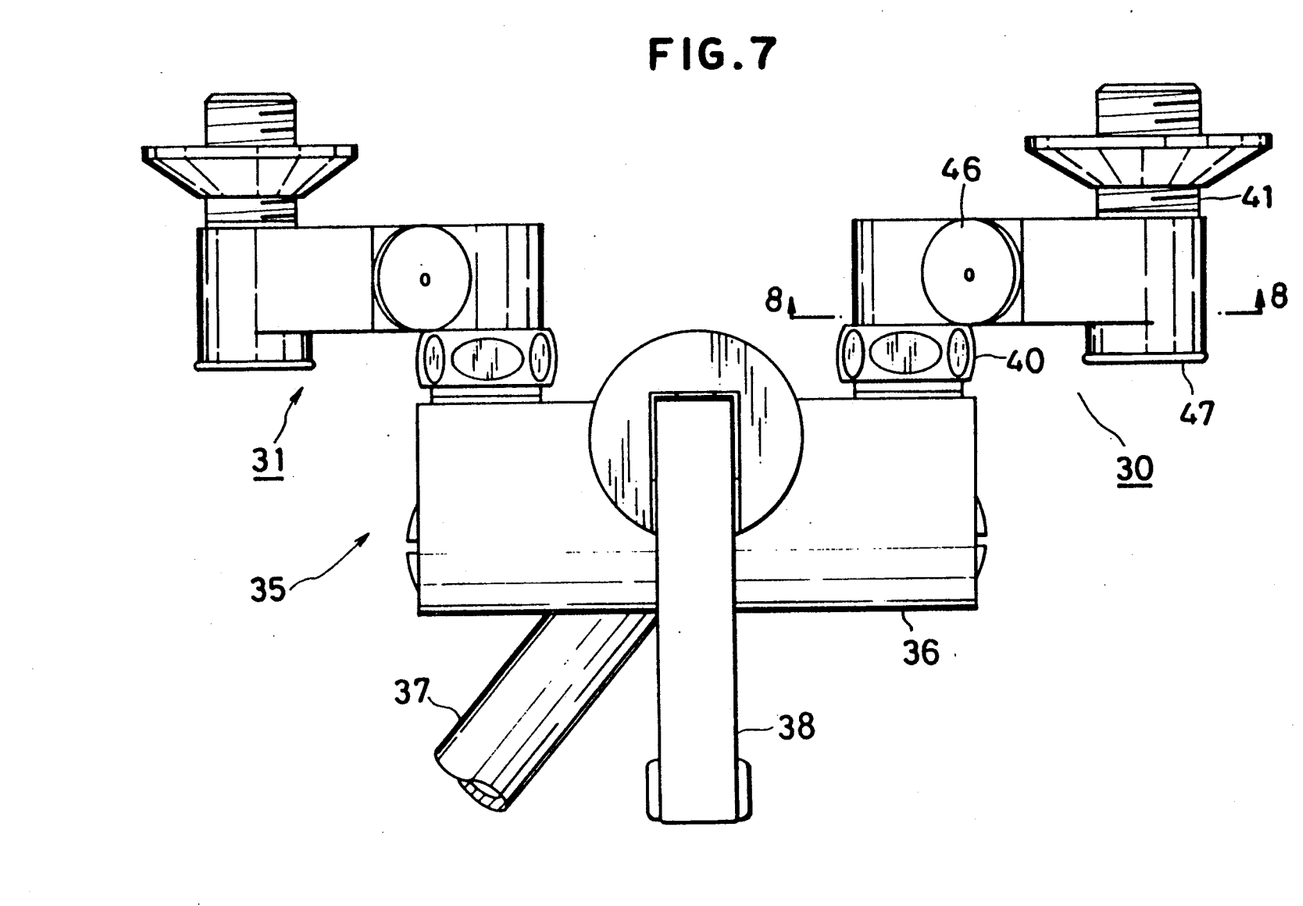
FIG. 7 is a plan view of a mixing faucet equipped with a water hammer absorber according to the invention.

Referring to FIG. 7, there is shown a mixing faucet 35 which has a water hammer absorber 30 mounted in a cold water supply pipe and another water hammer absorber 31 mounted in a hot water supply pipe. The body of the faucet 35 is indicated by numeral 36. The faucet 35 includes a delivery pipe 37 and a lever 38 for controlling the amount of delivery and the temperature of the delivered water.

Figure 8:
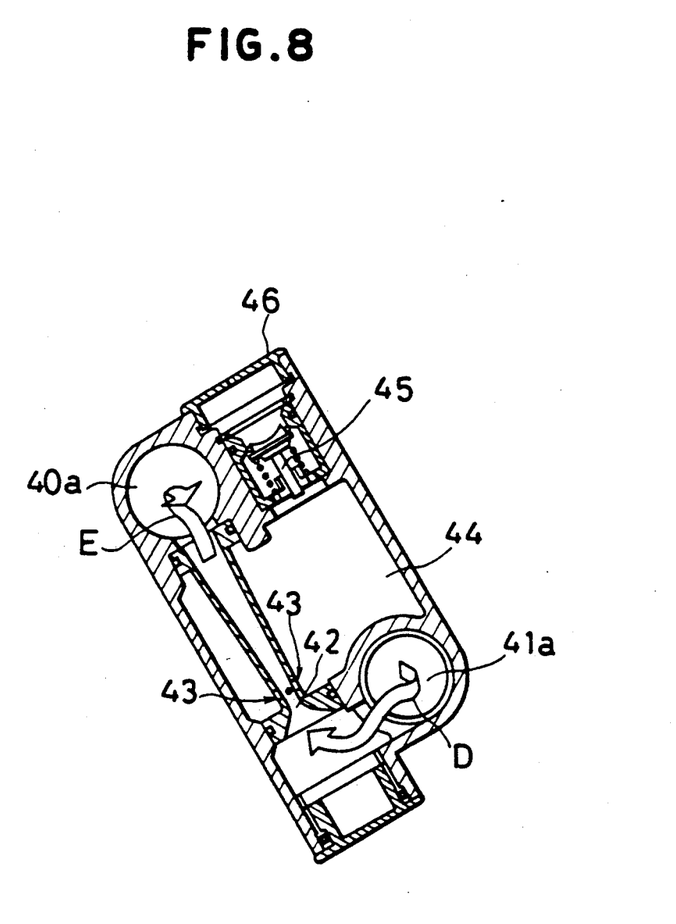
FIG. 8 is a cross-sectional view taken on line 8—8 of FIG. 7.

The absorber 30 shown in FIG. 8 is shown in FIG. 7 in cross section. This absorber takes the form of a rectangular box and is tilted. An inclined L-shaped channel which begins with a lower entrance 41a and ends with an upper exit 40a is formed inside the absorber. The entrance 41a extends downwardly as viewed in the figure to form an intake coupling 41 for connection with a water supply pipe (not shown) as shown in FIG. 7. The exit 40a extends upwardly as viewed in FIG. 8 to form a discharge coupling 40 for connection with the body 36 of the faucet as shown in FIG. 7. The channel formed between the couplings 40 and 41 is designed so that the lower end of the web is narrowest and that the inside diameter of the channel gradually increases from the narrowest portion 42 toward both ends. The narrowest portion 42 is formed with one or more water injection holes 43 extending laterally through it. In this specific example, both sides of the narrowest portion 42 are formed integrally out of an anticorrosion material, such as stainless steel, bronze, or brass, or other material, such as rubber or synthetic resin. A water stop cock 47 (FIG. 7) is mounted to the entrance 41a to control the flow rate or stop the flow during maintenance.

A pressure-absorbing chamber 44 is formed around the narrowest portion 42 and swells obliquely upwardly to form a boxlike portion. A check valve 45 used for air suction alone is mounted on the boxlike portion. A dustproof cap 46 is disposed over the check valve 45.

The operation of the absorber is now described by referring to FIG. 8. The absorber is so mounted that water flows in the direction indicated by the arrows D and E. When no water flows through the narrowest portion 42, the pressure-absorbing chamber 44 is substantially filled with water. It is now assumed that the lever 38 of the mixing faucet 35 (FIG. 7) is operated to open the passage and that water flows through the narrowest portion 42. Under this condition, the pressure inside the narrowest portion 42 becomes lower than the pressure inside the water supply pipe, creating a negative pressure. Thus, the water contained in the pressure-absorbing chamber 44 is drawn into the exit 40a through the water injection holes 43 in the narrowest portion 42. At the same time, outside air is drawn into the pressure-absorbing chamber 44 through the check valve 45. Thus the chamber 44 is filled with air.

If the lever 38 is quickly operated to stop the flow of water, then the pressure inside the body of the faucet 36 rises violently to produce a shock wave traveling in a reverse direction. The shock wave enters the pressure-absorbing chamber 44 via the water injection holes 43 as flow of water. Therefore, the energy of the shock wave is absorbed, and no reflecting wave is produced. Hence, the water hammer disappears. If the lever 38 is subsequently operated to open the faucet, then water again flows through the narrowest portion 42. The inside of the pressure-absorbing chamber 44 is again filled with air. Thus, preparations are made for absorption of the next shock wave.

The location of the narrowest portion 42 in the passage, the number of the water injection holes 43 formed in the narrowest portion 42, the diameter of the holes, the location of the holes, and other factors may be modified according to the pressure at which hot or cold water is supplied. In this way, the structure and the shape of the novel absorber can be varied according to practical circumstances.

What is claimed is:

1. A water hammer absorber, comprising:
    a tubular portion formed in a water supply passage for supplying cold or hot water, the cross-section of said tubular portion gradually decreasing in a direction of flow of the cold or hot water until an inner diameter of said tubular portion becomes minimum and then gradually increasing in said direction;
    a pressure-absorbing chamber formed at the minimum inner diametered section of said tubular portion or therearound at the downstream side thereof, so as to communicate with the water supply passage, said chamber having a passageway communicated with the atmosphere and a check valve mounted in the passageway for permitting air to flow only into the pressure-absorbing chamber;
    a communication passage provided between the water supply passage and the pressure-absorbing chamber; and
    means provided within said communication passage for permitting only cold or hot water to flow from the pressure-absorbing chamber into the water supply passage while inhibiting air from entering the water supply passage.

2. The water hammer absorber of claim 1, wherein said means includes a float valve and a valve seat against which said float valve is seated.

3. The water hammer absorber of claim 1, wherein said communication passage is a slit-like passageway extending in the circumferential direction of the water supply passage.

4. A water hammer absorber, comprising:
    an inner choke tube having a narrowed portion which is disposed in a water supply passage for supplying cold or hot water and which, when water flows through the narrowed portion, produces a negative pressure therein;
    a body portion disposed above the inner choke tube and having a pressure-absorbing chamber that is in communication with the narrowed portion in the choke tube through a water injection passage;
    a valve seat formed inside the pressure-absorbing chamber and around the entrance of the chamber from which the water injection passage extends; and
    a float valve which is disposed inside the pressure-absorber chamber opposite the valve seat and which is seated against the valve seat by the negative pressure produced in the narrowed portion;
    wherein when water hammer is produced in the water supply passage, water pushes the float valve upward and flows into the pressure-absorbing chamber, whereby the energy of the water hammer is absorbed.

5. The water hammer absorber of claim 4, wherein a short tapering pipe is mounted in the narrowed portion in the inner choke tube in such a way that all the water flowing into the choke tube passes through the tapering pipe and a clearance is formed between the inner surface of the narrowed portion and the outer periphery of the short taper tube so that a negative pressure is produced by the flow of water through the tapering pipe and is transmitted to the water injection passage through the narrowed portion.

6. The water hammer absorber of claim 4, wherein a check valve is mounted in the body portion to permit, when opened, air to flow into the pressure-absorbing chamber when a negative pressure is produced in the pressure absorbing chamber.

* * * * *